(12) United States Patent
Lin

(10) Patent No.: US 8,007,157 B2
(45) Date of Patent: Aug. 30, 2011

(54) LIGHT PIPE AND LIGHT GUIDING DEVICE WITH SAME

(75) Inventor: I-Thun Lin, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 235 days.

(21) Appl. No.: 12/542,048

(22) Filed: Aug. 17, 2009

(65) Prior Publication Data

US 2010/0238678 A1 Sep. 23, 2010

(30) Foreign Application Priority Data

Mar. 17, 2009 (CN) .......................... 2009 1 0300907

(51) Int. Cl.
*F21V 7/04* (2006.01)
*G02B 6/06* (2006.01)

(52) U.S. Cl. ........ 362/560; 362/551; 362/555; 385/116; 385/901

(58) Field of Classification Search .................. 362/551, 362/552, 556, 559, 560; 385/116, 901
See application file for complete search history.

(56) References Cited

U.S. PATENT DOCUMENTS

| | | | | |
|---|---|---|---|---|
| 3,532,873 | A * | 10/1970 | Batson et al. | 362/489 |
| 4,924,612 | A * | 5/1990 | Kopelman | 40/547 |
| 5,857,041 | A * | 1/1999 | Riser et al. | 385/31 |
| 6,880,276 | B2 * | 4/2005 | Strein et al. | 40/442 |
| 7,866,851 | B2 * | 1/2011 | Chang | 362/294 |

* cited by examiner

*Primary Examiner* — John A Ward
(74) *Attorney, Agent, or Firm* — Altis Law Group, Inc.

(57) ABSTRACT

An exemplary light pipe includes a main pipe and branch pipes. The main pipe includes a light inputting segment, an end portion, and a light outputting segment between the light inputting segment and the end portion. The light inputting segment includes connecting openings defined therein. A distance between each connecting opening and the end portion of the main pipe is different from a distance between each other connecting opening and the end portion of the main pipe. The branch pipes connect with the light inputting segment at the respective connecting openings.

19 Claims, 3 Drawing Sheets

LIGHT PIPE AND LIGHT GUIDING DEVICE WITH SAME

BACKGROUND

1. Technical Field

The present disclosure generally relates to light pipes and light guiding devices with light pipes, and particularly to light pipes with high luminance uniformity.

2. Description of Related Art

Light pipes are commonly used as light sources of display devices. A typical display device may, for example, have a display panel and a light guiding device with at least one light emitting diode (LED). The LED emits light to illuminate the display panel thereby enabling the display panel to display information to a user. The light guiding device may have a light pipe. The light pipe is usually shaped to efficiently transmit the LED-emitted light to the display panel.

In a typical display device, the LEDs are all of the same type, but emit different color light. The LEDs may have different brightness, due to factors such as manufacturing tolerances and aging. In such case, the light pipe may have low luminance uniformity, and the light guiding device with the light pipe correspondingly has low luminance uniformity. Thus the display device with the light guiding device may also correspondingly have low luminance uniformity and low efficiency.

Therefore, what is needed is a light pipe and a light guiding device with the light pipe, which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the views.

DETAILED DESCRIPTION

Figure 1:
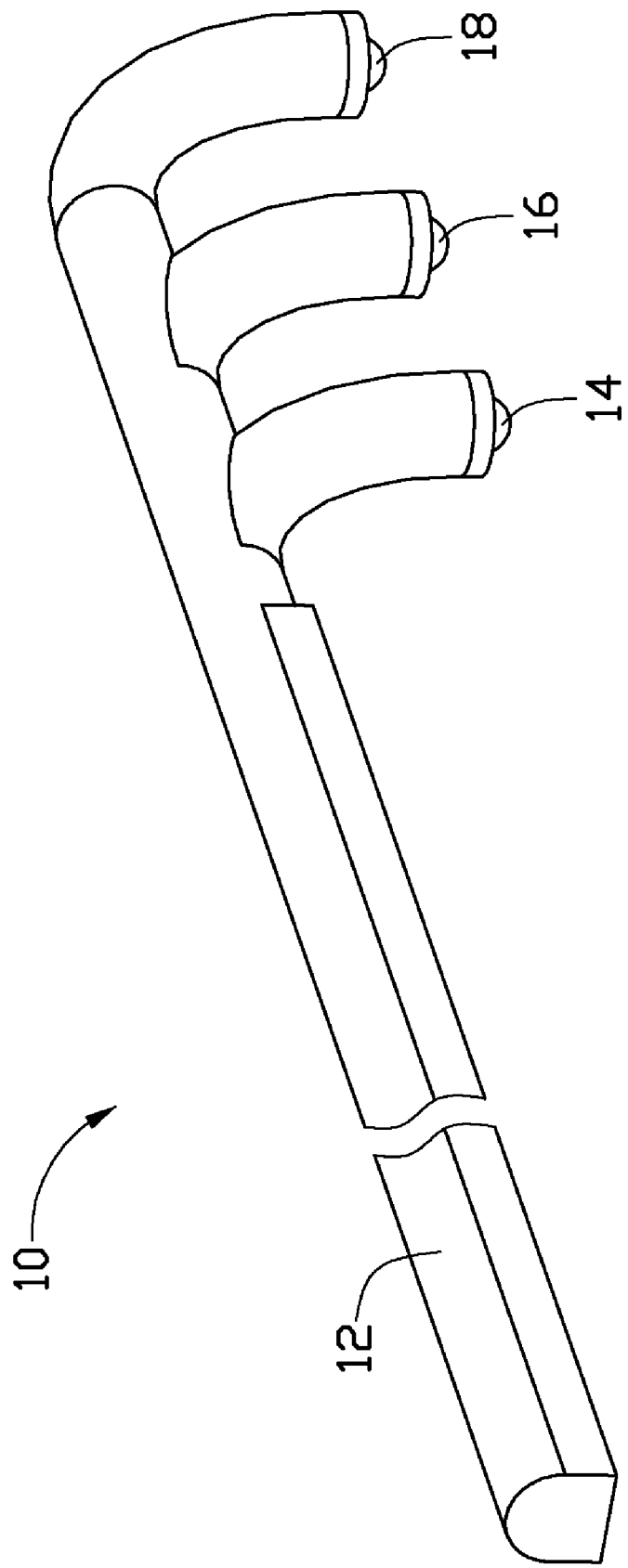
FIG. 1 is an isometric, abbreviated view of a light guiding device according an exemplary embodiment, the light guiding device including a light pipe.
Figure 2:
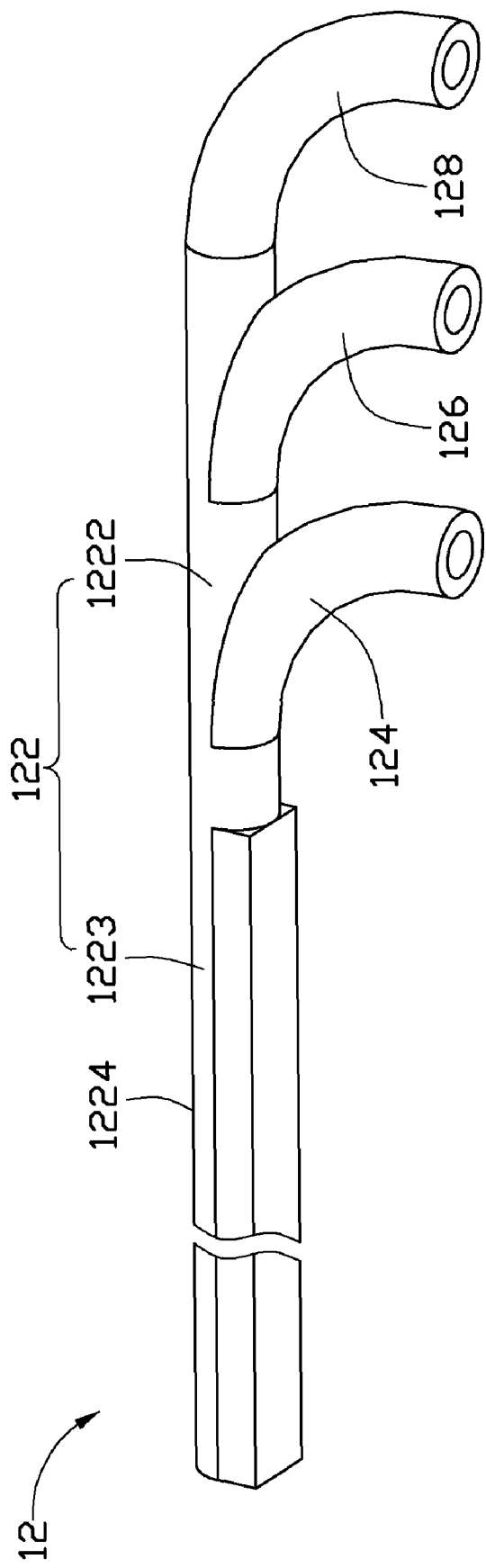
FIG. 2 is an isometric, abbreviated view of the light pipe of FIG. 1.

Referring to FIGS. 1-2, a light guiding device 10, in accordance with an exemplary embodiment, includes a light pipe 12 and light sources 14, 16, 18. In this embodiment, the light pipe 12 is substantially entirely made of amorphous glass. In other embodiments, the light pipe 12 may instead be made of plastic such as acrylate, methacrylate, polycarbonate, polyester, polyolefin, nylon, fluoropolymer, or any suitable combination thereof. In alternative embodiments, the light pipe 12 may instead be made of a combination of glass and plastic.

The light pipe 12 includes a main pipe 122, a first branch pipe 124, a second branch pipe 126, and a third branch pipe 128. In the present embodiment, the main pipe 122 is a straight, generally cylindrical body, and the first, second and third branch pipes 124, 126, 128 are arc-shaped bodies. In other embodiments, the first, second and third branch pipes 124, 126, 128 may instead be generally arcuate, generally curved, S-shaped, V-shaped, etc; and/or there can instead be two, four, or more branch pipes.

The main pipe 122 includes an end portion 1221, a light inputting segment 1222, and a light outputting segment 1223 integrally formed between the end portion 1221 and the light inputting segment 1222. The end portion 1221 is at an extremity of the main pipe 122 farthest away from the light inputting segment 1222.

Figure 3:
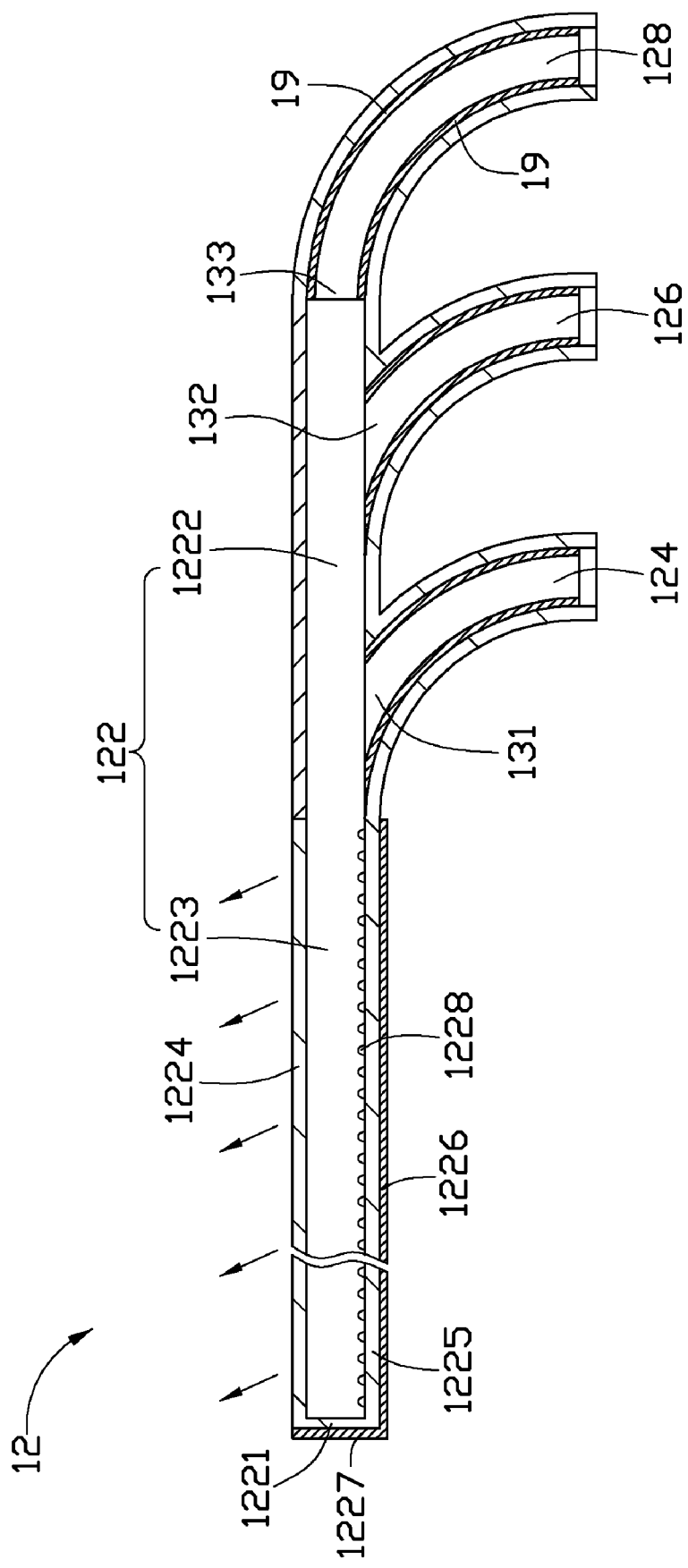
FIG. 3 is an abbreviated, cross sectional view of the light pipe of FIG. 1.

Referring also to FIG. 3, the light inputting segment 1222 includes a first connecting opening 131, a second connecting opening 132, and a third connecting opening 133. The first, second, and third connecting openings 131, 132, 133 are defined in a side wall of the light inputting segment 1222. The distance between the first connecting opening 131 and the end portion 1221 is different from each of the distance between the second connecting opening 132 and the end portion 1221, and the distance between the third connecting opening 133 and the end portion 1221. In the present embodiment, the first connecting opening 131 is nearest to the light outputting segment 1223; the third connecting opening 133 is farthest away from the light outputting segment 1223; and the second connecting opening 132 is between the first and third connecting openings 131, 133.

The first, second, and third branch pipes 124, 126, 128 respectively connect with the light inputting segment 1222 at the first, second, and third connecting openings 131, 132, 133. In the present embodiment, the first, second, and third branch pipes 124, 126, 128 are integrally formed with the light inputting segment 1222. That is, the light pipe 12 is a single, continuous body of material.

The light outputting segment 1223 includes a light outputting part 1224, and a light reflecting part 1225 generally opposite to the light outputting part 1224. The light outputting part 1224 is a part of a side wall of the light outputting segment 1223. The light reflecting part 1225 is another part of the side wall 1223a of the light outputting segment 1223. In the present embodiment, a transverse cross section of the light outputting part 1224 is generally semicircular, and a transverse cross section of the light reflecting part 1225 is generally semicircular.

The light reflecting part 1225 has a reflecting member 1226 formed on an outside thereof. The reflecting member 1226 is configured for reflecting light originating from the light sources 14, 16, 18 to prevent the light escaping from the light reflecting part 1225. In the present embodiment, the reflecting member 1226 is comprised of aluminum, and is formed on the outer surface of the light reflecting part 1225. In other embodiments, the reflecting member 1226 may instead be comprised of any other suitable metallic material (e.g., silver), and/or may instead be formed on an inner surface of the light reflecting part 1225.

The end portion 1221 has a reflecting member 1227 formed on an outside thereof. The reflecting member 1227 is configured for reflecting light originating from the light sources 14, 16, 18 to prevent the light escaping from the end portion 1221. In the present embodiment, the reflecting member 1227 is comprised of aluminum, and is formed on the outer surface of the end portion 1221. In other embodiments, the reflecting member 1227 may instead be comprised of any other suitable metallic material (e.g., silver), and/or may instead be formed on an inner surface of the end portion 1221.

The light reflecting part 1225 also has many light scatting microstructures 1228 formed on an inner side of the side wall thereof. The microstructures 1228 are configured for scattering incident light, such that light reflected by the light reflecting part 1225 is substantially uniform upon reaching the light outputting part 1224. In the present embodiment, the microstructures 1228 are protrusions. In other embodiments, the microstructures 1228 may instead be concavities defined in the inner side of the side wall of the light reflecting part 1225.

The first, second and third branch pipes 124, 126, 128 respectively have reflecting members 19 formed on inner walls thereof. The reflecting members 19 are configured for reflecting light emitted by the light sources 12, 14, 16 to prevent the light escaping from the first, second and third branch pipes 124, 126, 128, respectively. In the present embodiment, the reflecting members 19 are comprised of aluminum. In other embodiments, the reflecting members 19 can instead be comprised of any other suitable metallic material (e.g., silver), and/or can instead be formed on outer walls of the first, second and third branch pipes 124, 126, 128, respectively.

In the present embodiment, the reflecting members 1226 and 1227 are formed as a single, integral reflecting member. That is, the reflecting members 1226 and 1227 are portions of a single, continuous body of reflective material. In other embodiments, when there is a reflecting member 19 formed on the outer wall of one or more of the first, second and third branch pipes 124, 126, 128, any selected combination of the reflecting member 1226, the reflecting member 1227, the reflecting member 19 around the first branch pipe 124, the reflecting member 19 around the second branch pipe 126, and the reflecting member 19 around the third branch pipe 128, can be integrally formed as a single body of material.

The light emitted by the light sources 14, 16, 18 is respectively guided to the light inputting segment 1222 by the first, second and third branch pipes 124, 126, 128, and is mostly reflected by the light reflecting part 1225 to the light outputting part 1224. In the present embodiment, the light sources 14, 16, 18 are LEDs, which are all of the same type, but have brightness output capability that are different from each other. The light sources 14, 16, 18 are attached to distal ends of the branch pipes 124, 126, 128, respectively. The light source 14 is a blue LED, the light source 16 is a red LED, and the light source 18 is a green LED. The brightness output capability of the light source is lower than that of the light source 16, and the brightness output capability of the light source 16 is lower than that of the light source 18. That is, the brightness of the light source 14 is lower than that of the light source 16, and the brightness of the light source 16 is lower than that of the light source 18. In other embodiments, any one or more of the light sources 14, 16, 18 may instead emit yellow light, orange light, etc. In still other embodiments, there may instead be two, four, or more light sources.

The first connecting opening 131 is nearest to the light outputting segment 1223, the third connecting opening 133 is farthest away from the light outputting segment 1223, and the second connecting opening 132 is between the first and third connecting opening 131, 133. As such, the brightness of the light reaching the light outputting segment 1224 from each of the light sources 14, 16, 18 can be substantially the same. Therefore the light pipe 12 can have higher luminance uniformity (i.e., brightness uniformity), and the light guiding device 10 with the light pipe 12 can correspondingly have higher luminance uniformity and efficiency.

While certain embodiments have been described and exemplified above, various other embodiments will be apparent to those skilled in the art from the foregoing disclosure. The disclosure is not limited to the particular embodiments described and exemplified, but is capable of considerable variation and modification without departure from the scope and spirit of the appended claims.

What is claimed is:

1. A light pipe comprising:
    a main pipe, the main pipe comprising:
        a light inputting segment, the light inputting segment having a plurality of connecting openings defined therein;
        an end portion; and
        a light outputting segment between the light inputting segment and the end portion, a distance between each connecting opening and the end portion being different from a distance between each other connecting opening and the end portion; and
    a plurality of branch pipes connecting with the light inputting segment at the connecting openings, respectively.

2. The light pipe of claim 1, wherein the light outputting segment comprises a light outputting part, and a light reflecting part opposite to the light outputting part, the light outputting part is a part of a side wall of the light outputting segment, and the light reflecting part is another part of the side wall of the light outputting segment.

3. The light pipe of claim 2, wherein the light outputting part comprises a reflecting member formed thereon.

4. The light pipe of claim 2, wherein an inner side of the side wall of the light outputting part comprises light scattering microstructures formed thereat.

5. The light pipe of claim 1, wherein the end portion comprises a reflecting member formed thereon.

6. The light pipe of claim 1, wherein at least one of the branch pipes comprises a reflecting member formed thereon.

7. A light guiding device comprising:
    a light pipe, the light pipe comprising:
        a main pipe, the main pipe comprising:
            a light inputting segment, the light inputting segment having a plurality of connecting openings defined therein;
            an end portion; and
            a light outputting segment between the light inputting segment and the end portion, a distance between each connecting opening and the end portion being different from a distance between each other connecting opening and the end portion; and
        a plurality of branch pipes, the branch pipes connecting with the light inputting segment at the connecting openings, respectively; and
    a plurality of light sources having brightness output capabilities that are different from each other, the light source with the highest brightness output capability being attached to the branch pipe farthest away from the light outputting segment, and the light source with the lowest brightness output capability being attached to the branch pipe nearest to the light outputting segment, the branch pipes capable of guiding light emitted by the light sources to the light outputting segment.

8. The light guiding device of claim 7, wherein the plurality of branch pipes comprises three branch pipes, the plurality of light sources comprises three light sources, which respectively emit blue light, red light, and green light, the brightness output capability of the light source emitting blue light is lower than that of the light source emitting red light, the brightness output capability of the light source emitting red light is lower than that of the light source emitting green light, the light source emitting green light is attached to the branch pipe farthest away from the light outputting segment, the light source emitting blue light is attached to the branch pipe nearest to the light outputting segment, and the light source emitting red light is between the light source emitting green light and the light source emitting blue light.

9. The light guiding device of claim 7, wherein the light outputting segment comprises a light outputting part, and a light reflecting part opposite to the light outputting part, the light outputting part is a part of a side wall of the light outputting segment, and the light reflecting part is another part of the side wall of the light outputting segment.

10. The light guiding device of claim 9, wherein the light outputting part comprises a reflecting member formed thereon.

11. The light guiding device of claim 9, wherein an inner side of the side wall of the light outputting part comprises light scattering microstructures formed thereat.

12. The light guiding device of claim 7, wherein the end portion comprises a reflecting member formed thereon.

13. The light guiding device of claim 7, wherein at least one of the branch pipes comprises a reflecting member formed thereon.

14. A light guiding device comprising:
a light pipe, the light pipe comprising:
   a main pipe, the main pipe comprising:
     a light inputting segment, the light inputting segment having a plurality of connecting openings defined therein;
     an end portion; and
     a light outputting segment between the light inputting segment and the end portion, a distance between each connecting opening and the end portion being different from a distance between each other connecting opening and the end portion; and
   a plurality of branch pipes, the branch pipes connecting with the light inputting segment at the connecting openings, respectively; and
a plurality of light sources, the light sources being attached to ends of the branch pipes, respectively,
   wherein each of the light sources has a different luminosity from each other light source, and the luminosities of the light sources increase with increasing distance of the corresponding connecting openings from the end portion.

15. The light guiding device of claim 14, wherein the light outputting segment comprises a light outputting part, and a light reflecting part opposite to the light outputting part, the light outputting part is a part of a side wall of the light outputting segment, and the light reflecting part is another part of the side wall of the light outputting segment.

16. The light guiding device of claim 15, wherein the light outputting part comprises a reflecting member formed thereon.

17. The light guiding device of claim 15, wherein the light outputting part comprises light scattering microstructures formed thereon.

18. The light guiding device of claim 14, wherein the end portion comprises a reflecting member formed thereon.

19. The light guiding device of claim 14, wherein at least one of the branch pipes comprises a reflecting member formed thereon.

* * * * *